United States Patent
Hwang

(10) Patent No.: US 6,654,053 B1
(45) Date of Patent: Nov. 25, 2003

(54) VIDEO ZOOMING METHOD AND VIDEO CAMERA ADOPTING THE SAME

(75) Inventor: Deog-Won Hwang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 826 days.

(21) Appl. No.: 08/901,409

(22) Filed: Jul. 28, 1997

(30) Foreign Application Priority Data

Jul. 27, 1996 (KR) .............................................. 96-30892

(51) Int. Cl.[7] .............................................. H04N 5/262
(52) U.S. Cl. ................................ 348/240.1; 348/240.99
(58) Field of Search ................................ 348/347, 358, 348/240; 396/79, 81; 359/676, 698

(56) References Cited

U.S. PATENT DOCUMENTS 5,867,217 A * 2/1999 Okino et al. ................. 348/358
5,933,187 A * 8/1999 Hirasawa et al. ........... 348/358

* cited by examiner

*Primary Examiner*—Andrew Christensen
(74) *Attorney, Agent, or Firm*—Sughrue Mion, PLLC

(57) ABSTRACT

A video zooming method and video camera adopting the same prevents a near object from becoming out of focus when zooming. The video camera selects a tele-state (high-power magnification) according to input from a user to perform a zooming operation and then checks a focusing state. When the lens is in focus, a zooming operation is performed while zoom lens position information and corresponding focus lens position information are stored; when the lens is out of focus, optical zooming and focusing operations are performed using the just-previously stored focus lens position information and the corresponding zoom lens position information. Then, a digital zooming operation is performed with respect to the video signal obtained from the optical zooming and focusing operations. Thus, although an automatic focusing is performed when zooming the zoom lens, a near object is prevented from becoming out of focus when the magnification is high-power or greater.

10 Claims, 3 Drawing Sheets

VIDEO ZOOMING METHOD AND VIDEO CAMERA ADOPTING THE SAME

BACKGROUND OF THE INVENTION

The present invention relates to a video zooming method and a video camera adopting the same, and more particularly, to a video zooming method and a video camera adopting the same, in which although an auto-focusing is performed at a high-power magnification when a zooming operation is performed using a zoom lens, a near object is prevented from becoming out of focus.

Video cameras which have recently become popular for general home use employ a zoom lens having a range of magnifications of 2–10. A zoom lens can sequentially vary a focal distance of the lens from a wide-angle to a telephoto range, by a process which is called zooming. The zoom lens can vary the size of an image at random without departing from a focus if an object is in focus and then zoomed. A video camera also uses an auto-focus zoom lens. An auto-focus (AF) zoom lens adopts a fundamental principle which can automatically focus a camera on an object when the camera is directed toward the object. An AF mechanism of a video camera is disclosed in detail in an article "Auto Function (AF, AE, AWB)", published in *Television Institute Journal*, Vol. 49, No. 2, pp. 145–149, 1995. A conventional zooming method for a video camera employing an auto-focus zoom lens is schematically shown in FIG. 1.

FIG. 1 is a flow-chart diagram for explaining a conventional zooming method for a video camera.

In FIG. 1, a user can vary a magnifying power of a lens into a wide-angle state or a tele-state via a telephoto/wide-angle (T/W) switch which is attached to the video camera. When a wide-angle state is selected in the T/W switch, a scene appears farther and farther away, while when a tele-state is selected, the scene appears closer and closer. When the focus is adjusted in a video camera, an object is first brought into focus at the state where a zoom-in operation is not performed and then a zoom-out operation is performed; the object may be out of focus. Thus, when adjusting a focus, it is judged in step 101 whether a user of a video camera selects a magnification of the lens as a tele-state via a T/W switch. If the magnification of the lens selected is a tele-state, the video camera drives a zoom motor and performs a zooming operation in which the zoom lens is zoomed in a zoom-in direction (step 102). Since the position of a focus lens varies when zooming, the video camera drives an AF motor and automatically adjusts the focus lens, to thereby accurately focus on the object at the current zooming state (step 103).

However, when zooming at a high-power magnification, auto-focusing may cause a focal point of an object to be out of focus since the position of the focus lens varies. Such a problem cannot be solved in the case of a recent video camera which can perform a high-power magnification up to twenty magnifications via a digital zoom function.

SUMMARY OF THE INVENTION

To solve the above problems, it is an object of the present invention to provide a video camera zooming method for performing a digital zooming operation based on information on the nearest positions of a zoom lens and a focus lens which do not cause an object to be out of focus at the state of a high-power magnification of the zoom lens.

It is another object of the present invention to provide a video camera adopting the above zooming method.

To accomplish the above object of the present invention, there is provided a video camera zooming method comprising the steps of: (a) judging whether a focus lens is in focus while performing an optical zoom-in operation; (b) storing zoom lens position information and focus lens position information whenever it is determined that the focus lens is in focus in step (a); (c) performing an optical zooming operation and a focusing operation using the focus lens position information and corresponding zoom lens position information which are stored in step (b) when the focus lens is not in focus in step (a); and (d) performing a digital zooming operation with respect to a video signal obtained in step (c).

There is also provided a video camera comprising: a lens unit having a zoom lens and a focus lens; a memory; a control unit for controlling the lens unit based on an edge component so that an optical zoom-in operation and a focusing operation are performed, storing focus lens position information and corresponding zoom lens position information in the memory whenever the lens unit is in focus, and controlling the lens unit according to the focus lens position information and the corresponding zoom lens position information stored in the memory when the lens unit is out of focus; and a signal processor for detecting an edge component from a video signal received via the lens unit, supplying the detected edge component to the control unit and performing a digital zooming operation with respect to the video signal received when the lens unit is controlled based on the focus lens position information and the zoom lens position information stored in the memory.

BRIEF DESCRIPTION OF THE DRAWINGS

The preferred embodiment is described with reference to the drawings wherein.

DETAILED DESCRIPTION OF THE INVENTION

A preferred embodiment of the present invention will be described in detail with reference to the accompanying drawings.

Figure 1:
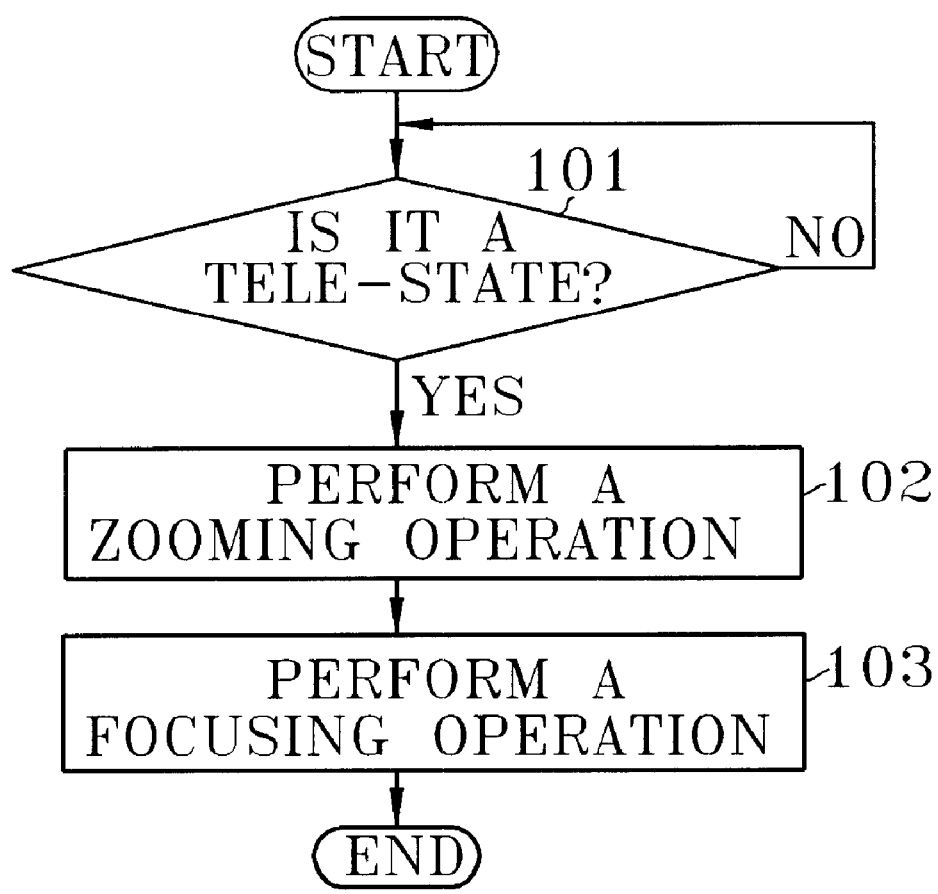
FIG. 1 is a flow-chart diagram for explaining a conventional zooming method for a video camera.
Figure 2:
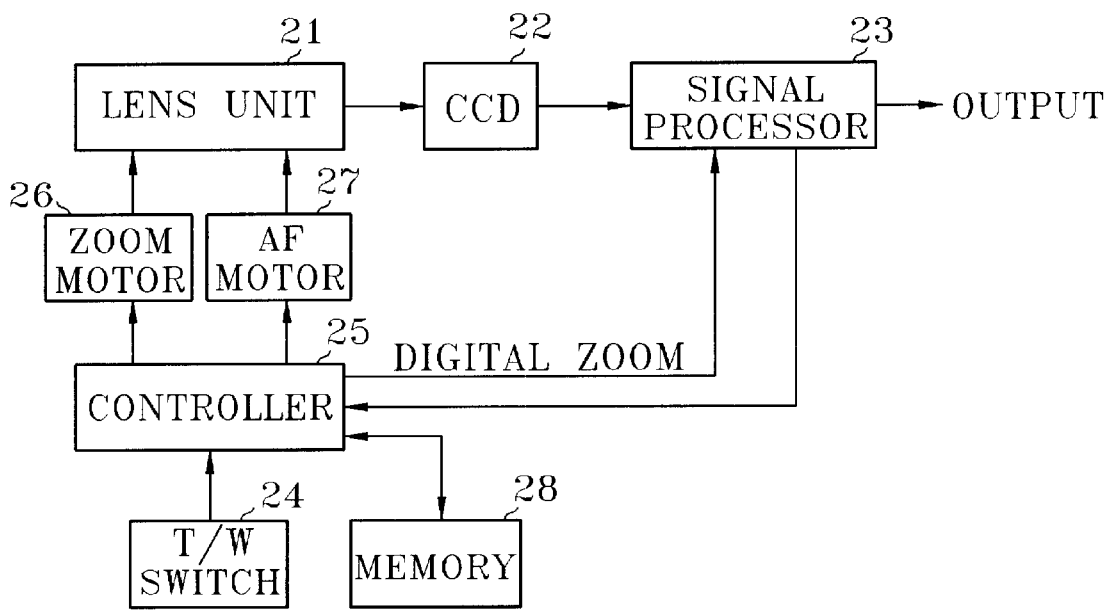
FIG. 2 is a block diagram showing a video camera adopting a video camera zooming method according to the present invention.

As shown in FIG. 2, a video camera according to the present invention includes a lens unit 21 having zoom lens (not shown) and focus lens and a solid-state imaging device 22 including a charge coupled device for photoelectrically converting a video signal input from the lens unit 21. A signal processor 23 receives a video signal which has been photoelectrically converted in the solid-state imaging device 22, and performs necessary signal processing such as focusing signal detection and digital zooming, to then output the signal processing result. The video camera of the present invention also includes a T/W switch 24 for selecting a magnification of a zoom lens, and a controller 25 for receiving a magnification select signal from the T/W switch 24 and a focusing signal detected in the signal processor 23 and controlling a zoom motor 26 for controlling an optical zooming operation of the lens 21 and an AF motor 27 for controlling an automatic focusing operation. The signal processor 23 for controlling the digital zooming operation is also connected to the controller 25. Meanwhile, the video camera of the present invention includes a memory 28 for storing data relating to the state where the lens unit 21 is in focus when zooming.

In FIG. 2, a user inputs a signal for selecting a magnification of a desired lens via the T/W switch 24. The controller 25 which receives a magnification select signal from the T/W switch 24 drives the zoom motor 26 and the AF motor 27 according to the selected magnification. The zoom motor 26 drives the zoom lens for performing a zooming operation in the lens unit 21. The AF motor 27 adjusts the position of the focus lens for performing a focusing operation in the lens unit 21. The optical video signal from the object input via the lens unit 21 is photoelectrically converted via the solid-state imaging device 22. The photoelectrically converted video signal is recorded on a recording medium or displayed on a monitor such as an electronic viewfinder after performing a necessary signal processing in the signal processor 23.

Figure 3:
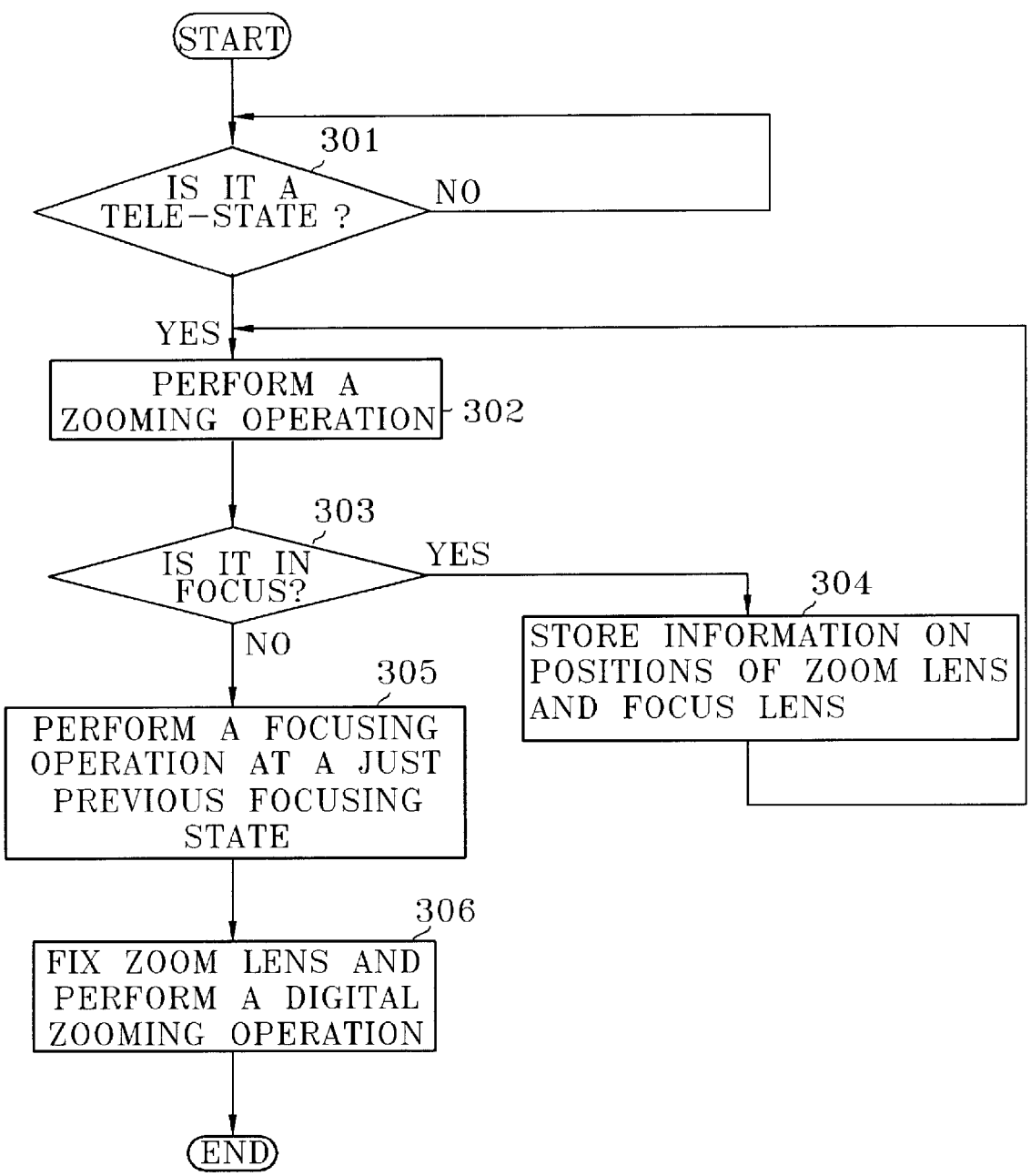
FIG. 3 is a flow-chart diagram for explaining the video camera zooming method of FIG. 2.

If a user selects a tele-state of a high-power magnification via the T/W switch 24, the controller 25 performs the procedures shown in FIG. 3.

FIG. 3 is a flow-chart diagram for explaining the video camera zooming method of FIG. 2. In FIG. 3, if a user selects a magnification via the T/W switch 24, the controller 25 judges whether a magnification select signal input from the T/W switch 24 indicates a tele-state (step 301). The controller 25 drives the zoom motor 26 according to the high-power magnification if the magnification select signal is a tele-state, in which the zoom motor 26 causes the zoom lens in the lens unit 21 to perform a zooming operation (step 302). Meanwhile, the optical video signal applied from the lens unit 21 is photoelectrically converted via the solid-state imaging device 22. The photoelectrically converted video signal is applied to the signal processor 23. Then, the signal processor 23 high-pass-filters the applied video signal to detect an edge component and outputs the edge component as a focusing signal to the controller 25. The controller 25 judges whether the lens unit 21 is exactly in focus using the focusing signal supplied from the signal processor 23 (step 303). The controller 25 judges that the lens unit 21 is in focus when the magnitude of the focusing signal applied from the signal processor 23 becomes a peak value and stores the focus lens position information and the zoom lens position information in the memory 28 (step 304). Then, the controller 25 repetitively performs a loop composed of steps 302 through 304 while zooming the zoom lens in a zoom-in direction. In step 303, the controller 25 drives the AF motor 27 and performs a focusing operation of the focus lens using the focus lens position information corresponding to a focal point just before the lens unit 21 is out of focus among the focus lens position information stored in the memory 28, if the lens unit 21 is not in focus due to a zoom-in operation exceeding the range of a high-power magnification (step 305). Then, the controller 25 fixes the position of the zoom lens in the lens unit 21 using the corresponding zoom lens position information stored in the memory 28 and controls the signal processor 23 so that a digital zooming operation is performed via signal processing such as interpolation (step 306). The video signal output from the signal processor 23 is interpolated horizontally and vertically in units of a field to thereby electrically extend the size of the video signal. The digital zooming function using an interpolation method is well-known, the detailed description thereof will be omitted.

As described above, when compared with a conventional method which positions a focus lens to cause a near object to be out of focus, the video zooming method and video camera adopting the same according to the present invention stores a focus position which helps to focus a lens when zooming at a high-power magnification and performs a digital zooming operation instead of an optical zooming operation at a focus position just before the lens becomes out of focus, although an automatic focus function is performed when zooming at a high-power magnification or greater, thereby preventing a near object from becoming out of focus even in at a high-power magnification or greater.

Although a preferred embodiment of the invention have been specifically described herein, numerous modifications may be made thereto without departing from the spirit and scope of the invention.

What is claimed is:

1. A video camera zooming method comprising the steps of:

(a) judging whether or not a focus lens is in focus while performing an optical zoom-in A operation;

(b) storing zoom lens position information and focus lens position information only when it is determined that the focus lens is in focus in step (a);

(c) continuing to perform the optical zooming operation only when it is determined in step (a) that the focus lens is in focus (d) performing a focusing operation, using the focus lens position information and corresponding zoom lens position information which have been stored in step (b), when the focus lens is judged to be not in focus in step (a) to obtain a video signal; and (e) performing a digital zooming operation with respect to the video signal obtained in step (d), when it is judged in step (a) that the focus lens is not in focus.

2. The video camera zooming method according to claim 1, wherein the optical zoom-in operation in step (a) starts from a tele-state.

3. The video camera zooming method according to claim 1, wherein said step (a) comprises the sub-steps of:

(a1) detecting an edge component from the video signal obtained by the optical zoom-in operation; and (a2) judging whether the focus lens is in focus using the edge component detected in step (a1).

4. The video camera zooming method according to claim 1, wherein said steps (c) and (d) respectively perform the optical zoom-in operation and the focusing operation using the focus lens position information and the zoom lens position information corresponding to a focal point just before the lens becomes out of focus.

5. The video camera zooming method according to claim 1, wherein said step (c) performs a digital zooming operation which interpolates a video signal in units of a field.

6. A video camera comprising:

a lens unit having a zoom lens and a focus lens;

a memory;

control means for controlling said lens unit based on an edge component from a video signal received from said lens unit so that an optical zooming operation and a focusing operation are performed, storing focus lens position information and corresponding zoom lens position information in the memory only when the lens unit is in focus, and, when the lens unit is out of focus, controlling the lens unit according to the focus lens position information and the corresponding zoom lens position information stored in the memory; and a signal processor for detecting the edge component from the video signal received via said lens unit, supplying the detected edge component to the control means and performing a digital zooming operation with respect to the video signal received when the lens unit is controlled based on the focus lens position information and the zoom lens position information stored in the memory.

7. The video camera according to claim 6, wherein said control means performs the optical zooming and the focusing operations using the focus lens position information and the zoom lens position information corresponding to a focal point just before the lens becomes out of focus.

8. The video camera according to claim 6, wherein said control means starts the optical zooming operation from a tele-state.

9. The video camera according to claim 6, further comprising an input key for a zoom-in operation and a zoom-out operation and wherein said control means starts the optical zooming operation and focusing operation when said zoom lens is set to a tele-state via said input key.

10. The video camera according to claim 6, wherein the digital zooming operation performed by said signal processor is an operation for interpolating a video signal in units of a field.

* * * * *